(12) United States Patent
Takahashi et al.

(10) Patent No.: US 6,857,785 B2
(45) Date of Patent: Feb. 22, 2005

(54) CAGED ROLLER ASSEMBLY AND REDUCTION GEAR UNIT USING THE SAME

(75) Inventors: Yasuaki Takahashi, Iwata (JP); Katsufumi Abe, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/098,369

(22) Filed: Mar. 18, 2002

(65) Prior Publication Data

US 2002/0141678 A1 Oct. 3, 2002

(30) Foreign Application Priority Data

| Mar. 27, 2001 | (JP) | 2001-089526 |
| Sep. 20, 2001 | (JP) | 2001-287734 |

(51) Int. Cl.⁷ .............................................. F16C 33/48
(52) U.S. Cl. ........................ 384/572; 384/577; 384/530; 475/179; 475/348
(58) Field of Search ................................ 475/179, 348; 384/572, 577, 578, 584, 523, 530

(56) References Cited

U.S. PATENT DOCUMENTS

| 4,626,113 A | * | 12/1986 | Forknall et al. | ............ | 384/530 |
| 4,712,661 A | * | 12/1987 | Lederman et al. | ............ | 192/45 |
| 4,732,496 A | * | 3/1988 | Shail | ......................... | 384/526 |
| 5,743,659 A | * | 4/1998 | Stewart | ....................... | 384/573 |

OTHER PUBLICATIONS

Patent Abstracts of Japan, Publication No. 2000–179544, Jun. 27, 2000; Harimoto Kauyoshi, et al.

* cited by examiner

*Primary Examiner*—David A. Bucci
*Assistant Examiner*—Julie K. Smith

(57) ABSTRACT

To provide a caged roller assembly having an excellent assimilability, capable of providing a relatively large load bearing capacity, excellent in roller guiding function, strength and accuracy, the caged roller assembly includes a cage 1 including an outer member 3 and an inner member 4, and an array of rollers 2. The outer member 3 is made up of an annular body 3a of a diameter greater than the pitch circle diameter PAD of the array of the rollers and collars 3b each formed by bending a corresponding end of the annular body 3a so as to extend radially inwardly therefrom. The inner member 4 is of an annular shape having a diameter smaller than the pitch circle diameter PAD. Pockets 5 and 6 are defined in the outer and inner members 3 and 4 with the rollers 2 supported in part within the pockets 5 in the outer member 3 and in part within the pocket 6 in the inner member 4. The collars 3b may alternatively be provided in the inner member 4, rather than the outer member 3. One of the outer and inner members that is a collarless member has a slit 9 defined at one location circumferentially thereof to provide a generally split ring shape.

12 Claims, 8 Drawing Sheets

CAGED ROLLER ASSEMBLY AND REDUCTION GEAR UNIT USING THE SAME

BACKGROUND OF THE INVENTION

1. Field of the Invention

The present invention relates to a caged roller assembly capable of providing a large load bearing capacity within a predetermined space, and a planetary gear reduction unit using such caged roller assembly.

2. Description of the Prior Art

A full type roller bearing has been well known as a bearing capable of providing a maximum load bearing capacity within a limited space. However, the full type roller bearing has a problem associated with handling thereof, particularly during assemblage and/or dismantling and also tends to pose a functional problem such as, for example, that associated with roller skewing during use thereof.

To alleviate those problems, various caged roller assembles have hitherto been suggested. The cage used therein to movably retain a plurality of rollers in circumferentially juxtaposed fashion must have two types of retainers for preventing the rollers from separating outwardly and inwardly, respectively.

An example of the cage of the kind discussed above is shown in FIGS. 10A and 10B. The illustrated cage, generally identified by 70, is of a generally ring shape having a width conforming to a longitudinal direction of each rollers 74 and, when cut along the widthwise direction thereof, represents a generally M-shaped section delimited by an intermediate annular wall 71 of a diameter smaller than the pitch circle diameter PAD occupied by the longitudinal axes of the circumferentially juxtaposed rollers 74, first and second side annular walls 72 and 72 one on each side of the intermediate annular wall 71 and having a diameter larger than the pitch circle diameter PAD, and first and second annular collars 73 and 73 each bent radially inwardly from the adjacent outer annular wall 72. The cage 70 has a plurality of roller pockets 75 defined therein so as to be equidistantly spaced from each other in a direction circumferentially of the cage 70 for movably accommodating the respective rollers 74 therein, while leaving a pillar between each neighboring pockets 75.

In this illustrated cage 70, the first and second outer annular walls 72 and 72 jointly serve as a first retainer for preventing the rollers 74 from separating outwardly in a direction axially of the rollers 74 whereas the intermediate annular wall 71 serves as a second retainer for preventing the rollers 74 from separating radially inwardly of the cage 70. More specifically, while each of the roller pockets 75 defined in the cage 70 is delimited by mutually confronting long side edges and mutually confronting end edges, the cage 70 has a plurality of pairs of stop pieces 76, one pair for each pocket 75, protruding into the associated pocket 75 from the long side edge while leaving a space therebetween of a size smaller than the outer diameter of the respective roller 74. Each of the rollers 74 is generally mounted in the associated pocket 75 from inside the cage 70 by causing the corresponding stop pieces 76 to be elastically deformed to pass the roller 74 therebetween into the pocket 75.

If the number of the rollers 74 to be accommodated by the cage 70 within a predetermined space (i.e., the cage 70 having given inner and outer diameters), the width a of the pillar between the neighboring pockets 75 as shown in FIG. 10B has to be reduced. Reduction of the pillar width a brings about not only a limit for machining, but also reduction in physical strength of the cage 70 as a whole. For this reason, there is a need to provide a cage of a structure fundamentally different from the illustrated cage 70.

When it comes to the caged roller assembly that is to be interposed between a planetary gear of a planetary gear reduction unit and a crankshaft, a stringent requirement is imposed on the total surface area of collars of the roller cage. In other words, in the type in which the neighboring crank pins of the crankshaft have respective planetary gears mounted thereon in a juxtaposed fashion, it has been found that as the crank pins undergo an eccentric rotation the collars of the cage tend to frictionally contact respective end faces of the neighboring planetary gears. For this reason, unless each of the collars of the cage have a sufficient surface area, they would interfere with inner peripheries of the neighboring planetary gears.

In order to alleviate the foregoing inconveniences, the assignee of the present invention has suggested, in the Japanese laid-open Patent Publication No. 2000-179544, such a caged roller assembly as shown in FIGS. 11A and 11B. As shown therein, the caged roller assembly disclosed in this Japanese laid-open Patent Publication No. 2000-179544 includes a two-piece cage 81 including generally ring-shaped outer and inner annular members 83 and 84, and a plurality of rollers 82. The outer member 83 includes a ring body 83a of a diameter greater than the pitch circle diameter PAD depicted by respective longitudinal axes of the array of the rollers 82 and first and second annular collars 83b and 83b each bent radially inwardly from opposite ends of the ring body 83a. On the other hand, the inner member 84 is of a generally ring shape having a diameter smaller than the pitch circle diameter PAD depicted by the respective longitudinal axes of the rollers 82. The ring body 83a of the outer member 83 is formed with a plurality of circumferentially equidistantly spaced pockets 85 and the inner member 84 is similarly formed with a corresponding number of circumferentially equidistantly spaced pockets 86. Each of the rollers 82 is movably supported by the outer and inner members 83 and 84 while received in part in the corresponding pocket 85 and in part in the associated pocket 86 with its longitudinal axis aligned in a direction widthwise of each of the outer and inner members 83 and 84. Alternatively, the collars 83b, although they are in one embodiment integral with the outer member 83, may be formed in the inner member 84.

The use of the two-piece cage 81 made up of the outer and inner members 83 and 84 is advantageous in that each of the outer and inner members 83 and 84 can be manufactured to have a plurality of pillars 87 and 88 of a reduced width and, therefore, a relatively large number of rollers 82 can be accommodated within the limited available space. Also, since one of the members, that is, the outer member 8 is provided with the collars 83b, sliding contact with the neighboring component parts does not pose any problem.

However, it has been found that the caged roller assembly disclosed in the above mentioned publication has a problem in assimilability. More specifically, when it comes to assemblage of the caged roller assembly, the rollers 82 are first mounted on the outer member 83 having the collars 83b so as to be received in the associated pockets 85, followed elastically mounting the collarless member, that is, the inner member 84 along the inscribed circle of the array of the rollers 82. (Alternatively, where the collarless member is the outer member, the outer member is elastically mounted along the circumscribed circle of the array of the rollers 82.). It has been found that during this elastic mounting, the collarless member 84 does little deform elastically and, therefore, requiring an increase in number of process steps. In particular, where the collarless member 84 is made of a metallic material, mounting would be hardly achieved unless the dimensional accuracy is precisely controlled.

SUMMARY OF THE INVENTION

In view of the foregoing, the present invention has for its primary object to provide an improved caged roller assembly that is excellent in assimilability, capable of securing a large load bearing capacity within a limited space, excellent in roller guiding function, strength and accuracy and that poses no problem associated with interference with neighboring component parts even when the caged roller assembly is brought into sliding contact with such neighboring component parts, and an improved planetary gear reduction unit utilizing such caged roller assembly.

In order to accomplish the foregoing object, the present invention in accordance with one aspect thereof provides a caged roller assembly including a cage including outer and inner members, and a circumferential array of rollers movably retained by the cage and defining a pitch circle diameter and having inscribed and circumscribed circle diameters. The outer member includes an annular body of a diameter greater than the pitch circle diameter of the circumferential array of the rollers and annular collars each formed by bending one of opposite end portions of the annular body so as to extend radially inwardly therefrom. On the other hand, the inner member is of an annular shape having a diameter smaller than the pitch circle diameter of the circumferential array of the rollers. The annular body of the outer and inner member have respective pockets defined therein in circumferentially spaced relation to each other, with the rollers movably received in part within the corresponding pockets in the annular body of the outer member and in part within the corresponding pockets in the inner member. The inner member used in this caged roller assembly has a capability of being circumferentially deformed to a diameter smaller than the inscribed circle pitch of the circumferential array of the rollers.

According to the present invention, since the inner member has a capability of being circumferentially deformed to a diameter smaller than the inscribed circle pitch of the circumferential array of the roller, when during assemblage the inner member is to be mounted after the rollers have been disposed in the corresponding pockets in the outer member that is a collared member, the inner member is circumferentially deformed to the diameter smaller than the inscribed circle diameter of the circumferential array of the rollers so that the inner member can be mounted from radially inside the circumferential array of the rollers. Because of this, the caged roller assembly of the present invention has an excellent assimilability.

Also, since the cage is of two-piece construction including the outer and inner members, a function of preventing an unwanted separation of the rollers radially outwardly and a function of preventing an unwanted separation of the rollers radially inwardly are shared by the outer and inner members, respectfully, thereby simplifying respective roles of the outer and inner members. For this reason, the outer and inner members can have a simplified shape and can therefore be manufactured easily enough to lower a processing limitation to which the pillar between each neighboring pockets can be narrowed. Thus, the number of the rollers that can be employed within a predetermined space can therefore be increased to enable the caged roller assembly to have an increased load bearing capacity.

Also, since as discussed above the outer and inner members have a simplified shape, it is possible to improve the roller guiding function while exhibiting an excellent strength and accuracy. In particular, where the strength of the pillars that are difficult to secure a required pillar width tends to decrease, it is possible for the inner member to have a plate thickness greater than that of the outer member, thus providing a relatively large freedom of optimum design choice.

In addition, since the outer member is provided with the collars, each collar can have a substantial surface area and, for this reason, even where the caged roller assembly of the present invention is mounted on a crankshaft or the like for support of a planetary gear and is brought into sliding contact with neighboring component parts, the cage of the caged roller assembly is substantially free from interference with an inner peripheral surface of the neighboring components such as planetary gears.

The present invention in accordance with another aspect thereof provides a caged roller assembly that is similar to the caged roller assembly provided for in accordance with the first mentioned aspect of the present invention, but differs therefrom in that the outer and inner members are reversed relative to each other with respect to the collared member. Specifically, the outer member is of an annular shape having a diameter greater than the pitch circle diameter of the circumferential array of the rollers, and the inner member includes an annular body of a diameter smaller than the pitch circle diameter of the circumferential array of the rollers and annular collars each formed by bending one of opposite end portions of the annular body of the inner member so as to extend radially outwardly therefrom. The outer member has a capability of being circumferentially deformed to a diameter greater than the circumscribed circle pitch of the circumferential array of the rollers.

According to the second mentioned aspect of the present invention, since the outer member has a capability of being circumferentially deformed to a diameter greater than the circumscribed circle pitch of the circumferential array of the rollers, when during assemblage the outer member is to be mounted after the rollers have been disposed in the corresponding pockets in the inner member that is a collared member, the outer member is circumferentially deformed to the diameter greater than the circumscribed circle diameter of the circumferential array of the rollers so that the outer member can be mounted from radially outside the circumferential array of the rollers. Because of this, the caged roller assembly of the present invention has an excellent assimilability.

Also, as is the case with the first mentioned aspect of the present invention, not only can the caged roller assembly have a large load bearing capacity within the predetermined space, but also it can exhibit an excellent roller guiding function, strength and accuracy and is substantially free from any problem associated with the interference even where the cage slidingly contacts the neighboring component parts.

In the practice of the present invention, one of the outer and inner members, which is a collarless member, may have ends opposite to each other. The presence of the opposite ends in the collarless member, even if the collarless member is made of a metallic material, allows the collarless member to be deformed elastically to a diameter greater or smaller than the inscribed or circumscribed circle diameter of the circumferential array of the rollers.

To employ such a structure having opposite ends, the collarless member may have a slit defined therein so as to extend in a direction axially of the caged roller assembly. The formation of the slit in the collarless member so as to extend in the direction axially of the caged roller assembly can facilitate the collarless member to be deformed elastically to a diameter greater or smaller than the inscribed or circumscribed circle diameter of the circumferential array of the rollers.

Where the slit is defined in the collarless member, the slit may be so shaped as to permit opposite ends of the collarless member on respective sides of the slit to be engageable with each other in a direction radially of the caged roller assembly. This engagement may suffice to take place when the outer and inner retainers are assembled together to complete the caged roller bearing, and may not necessarily occur when the collarless member is isolated and off the caged roller assembly. Also, this engagement may occur in such isolated state or a natural state, or may occur when the opposite ends of the collarless member displace radially relative to each other, even though the opposite ends of such collarless member are radially disengaged in the isolated state.

Where the slit defined in the collarless member is of a design making it possible for the opposite ends of the collarless member to engage in the radial direction of the caged roller assembly as hereinabove described, engagement of the opposite ends of the collarless member in the radial direction can take place when, as a result of a radially acting load imposed on some of the rollers adjacent a portion of the collarless member where the slit is defined, a force acts on the collarless member so as to deform such collarless member to a diameter smaller or greater than the inscribed or circumscribed circle diameter of the circumferential array of the rollers. For this reason, the rigidity of one of the opposite ends of the collarless member remote from the other of the opposite ends where the radially acting load is imposed can provide a resistance to the load, making it difficult for the collarless member to be deformed to such diameter smaller or greater than the inscribed or circumscribed circle diameter of the circumferential array of the rollers. In this way, there is no possibility of fall-off of some of the roller which would otherwise occur when the collarless member is so deformed, with the consequence that the function of preventing the rollers from separating from the right position can be enhanced.

The caged needle roller assembly of the present invention may be disposed between a planetary gear of a planetary gear reduction unit and a crankshaft supporting the planetary gear.

The present invention also provides a planetary gear reduction unit including an internally or externally threaded sun gear, a carrier disposed rotatably in a coaxial relation with the sun gear, a crankshaft supported rotatably by the carrier and having a plurality of neighboring crank pins, and a plurality of planetary gears mounted rotatably on the respective crank pins of the crankshaft through corresponding caged roller assemblies and meshed with the sun gear. In this planetary gear reduction unit, the caged roller assembly constructed in accordance with the present invention is employed for each of the caged roller assemblies. In other words, each of the caged roller assemblies employed in this planetary gear reduction unit includes a cage including outer and inner members, and a circumferential array of rollers movably retained by the cage while being received in part in corresponding pockets in the inner member and in part in corresponding pockets in the outer member. The rollers define a pitch circle diameter and having inscribed and circumscribed circle diameters, and are capable of undergoing a rolling motion between the corresponding planetary gear and the corresponding crank pin of the crankshaft. The outer and inner members have respective annular bodies of diameters greater and smaller than the pitch circle diameter of the circumferential array of the rollers. In addition, the outer member has annular collars each formed by bending one of opposite end portions of the annular body of the outer member so as to extend radially inwardly therefrom, while the inner member has a capability of being deformed to a diameter smaller than the inscribed circle pitch of the circumferential array of the rollers. Alternatively, the inner member has annular collars each formed by bending one of opposite end portions of the annular body of the inner member so as to extend radially outwardly therefrom, while the outer member has a capability of being deformed to a diameter greater than the circumscribed circle pitch of the circumferential array of the rollers.

As is well known to those skilled in the art, in the planetary gear reduction unit having the planetary gears mounted on the crankshaft, each of the caged roller assemblies interposed between the planetary gears and the crank pins of the crankshaft is required to avoid any possible interference with inner peripheral surfaces of the neighboring planetary gears. This function of avoiding any possible interference can be exhibited by the collars formed in the collared member of the cage. Also, in this planetary gear reduction unit, while a relatively large load is required to support the planetary gears and a space for accommodating a support device therefore is limited, the use of the cage of the two-piece construction including the outer and inner members can provide an excellent roller guiding function, strength and accuracy and makes it possible to increase the number of the roller used within the limited space and/or to enable each of the rollers to have an increased diameter, with the caged roller assembly consequently having a relatively large load bearing capacity.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1A:
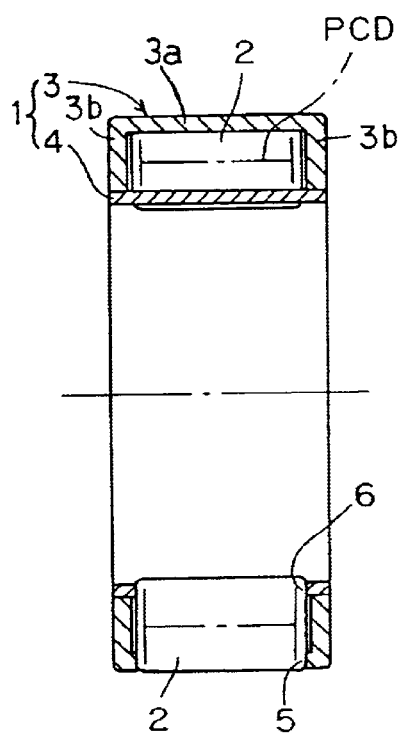
FIG. 1A is a longitudinal sectional view of a caged roller assembly according to a first preferred embodiment of the present invention.

A caged roller assembly according to a first preferred embodiment of the present invention will now be described with particular reference to FIGS. 1A and 1B, FIG. 2 and FIG. 3. The caged roller assembly shown therein includes a cage 1, including generally ring-shaped outer and inner retainers 3 and 4, and a plurality of rollers 2 each movably supported in part by the outer retainer 3 and in part by the inner retainer 4 in a manner as will be described in detail later. The outer retainer 3 has an annular body 3a of a diameter (either inner or outer) greater than the pitch circle diameter PAD of a circumferential array of the rollers 2 and also has first and second collars 3b that are formed by bending opposite end portions of the annular body 3a so as to extend radially inwardly therefrom. On the other hand, the inner retainer 4 has a diameter (either inner or outer) smaller than the pitch circle diameter PAD of the circumferential array of the rollers 2. Each of the annular body 3a and the inner retainer 4 is formed in a cylindrical configuration. A plurality of generally rectangular pockets 5 are formed in the annular body 3a of the outer retainer 3 in a circumferentially equidistantly spaced relation so as to leave pillars 7 each between the neighboring pockets 5, while similarly rectangular pockets 6 equal in number to the number of the pockets 5 and, hence, to the number of the rollers 2 are formed in the inner retainer 4 in a similarly circumferentially equidistantly spaced relation so as to leave pillars 8 each between the neighboring pockets 6. Each of the rollers 2 is supported by the outer and inner retainers 3 and 4 while being movably received in part within the corresponding pocket 5 and in part within the mating pocket 6.

Figure 2:
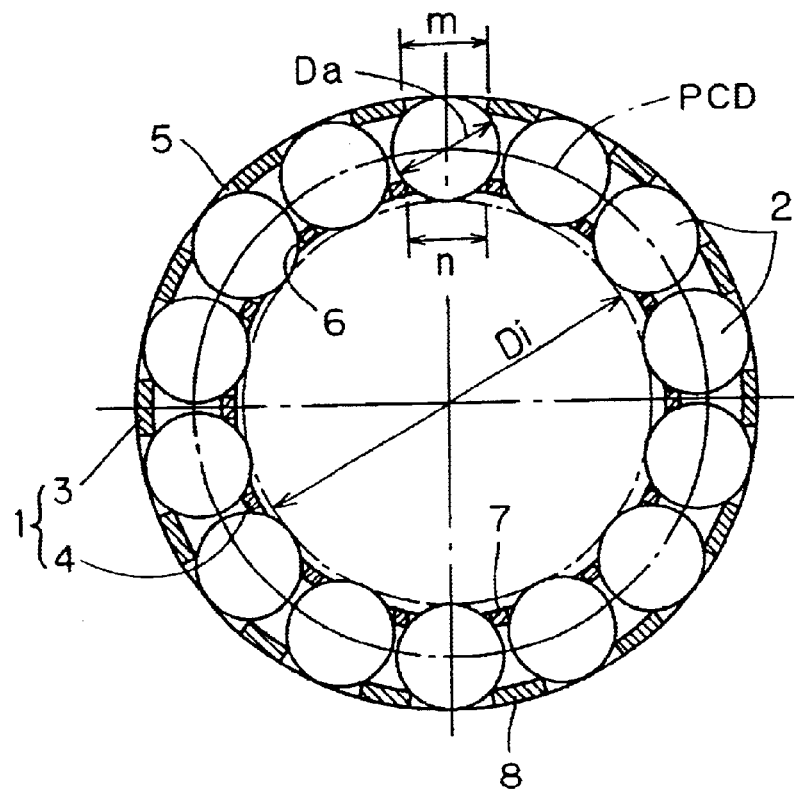
FIG. 2 is a transverse sectional view of the caged roller assembly shown in FIG. 1A.

The outer retainer 3 that is a collared member is of a design wherein as best shown in FIG. 2, each of the pockets 5 defined therein has a width m, measured in a direction tangential to an inner peripheral surface of the annular body 3a, that is slightly smaller than the outer diameter Da of each roller 2 so that in an assembled condition of the caged roller assembly the corresponding roller 2 will not separate radially outwardly through the corresponding pocket 5. Similarly, the inner retainer 4 that is a collarless member is of a design wherein each of the pockets 6 defined therein has a width n slightly smaller than the outer diameter Da of each roller 2 so that in the assembled condition the corresponding roller 2 will not separate radially inwardly through the corresponding pocket 5.

Figure 1B:
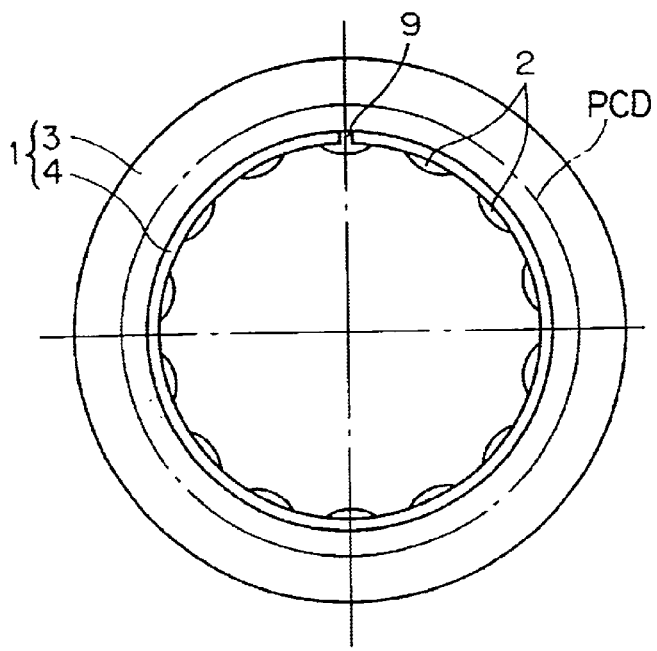
FIG. 1B is an end view of the caged roller assembly shown in FIG. 1A.

The inner retainer 4 is made capable of being circumferentially deformed to a diameter smaller than the inscribed circle pitch Di of the circumferential array of the rollers. In the illustrated embodiment, as best shown in FIG. 1B, the inner retainer 4 is of a split ring shape having a slit 9 defined at one location circumferentially thereof so as to extend straight across the inner retainer 4 in a direction axially of the cage 1 thereby to leave opposite ends in the inner retainer 4. The position where the slit 9 is defined in the inner retainer 4 may be at one of the pillars 8 or in alignment with one of the pockets 6. This inner retainer 4 when in an elastically restored state may be of a size either sufficient to allow it to be resiliently urged against inner peripheral edges of the respective collars 3b of the outer retainer 3 or sufficient to form a gap between it and the outer retainer 3.

Figure 3:
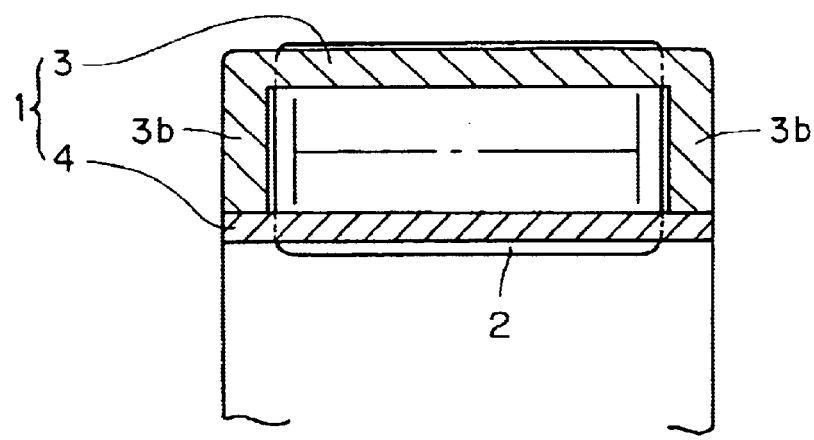
FIG. 3 is a fragmentary longitudinal sectional view of the caged roller assembly with only one of longitudinal halves thereof shown on an enlarged scale.

According to the design described hereinabove with reference to FIGS. 1 to 3, the caged roller assembly can be assembled by first mounting the rollers 2 on the outer retainer 3, that is a collared member, with the rollers 2 received in part within the corresponding pockets 5 and then mounting the inner retainer 4 to the array of the rollers 2. Specifically, when the inner retainer 4 is so mounted, the inner retainer 4 is circumferentially inwardly deformed to a diameter smaller than the inscribed circle diameter of the circumferential array of the rollers 2 so that after the inner retainer 4 has been inserted inside the inscribed circle of the rollers 2 the inner retainer 4 can circumferentially outwardly expand by the effect of its own resiliency. This is possible because of the presence of the slit 9, allowing the inner retainer 4 to be resiliently deformed to a diameter smaller than the inscribed circle diameter of the circumferential array of the rollers 2. Thus, the caged roller assembly according to the foregoing embodiment has an excellent assimilability.

Since during the use of the caged roller assembly the cage is of the two-piece construction made up of the separate outer and inner retainers 3 and 4 and a function of preventing the rollers 2 from separating out of the pockets 5 and 6 is shared by the outer and inner retainers 3 and 4, the cased roller assembly can easily be manufactured with any possible limitation in processing eliminated and, therefore, the number of the rollers 2 used within a limited space can be increased to allow the caged roller assembly to exhibit an increased load bearing capacity. Also, the caged roller assembly can have an improved roller guiding function while being robust in strength and accuracy. Moreover, the provision of the collars 3b in the outer retainer 3 is effective to avoid any possible interference with inner peripheral surfaces of neighboring component parts even though the cage 1 is brought into sliding contact with such neighboring component parts.

Figure 4:
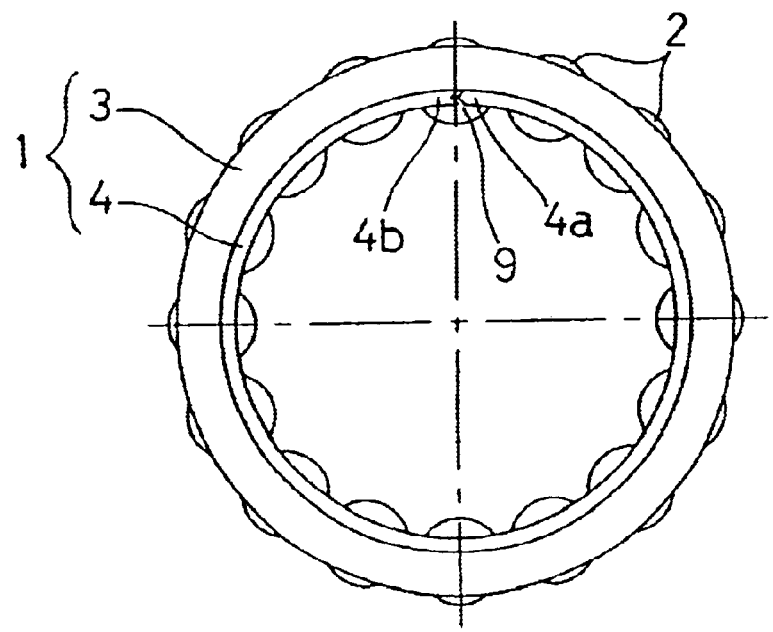
FIG. 4 is an end view of the caged roller assembly according to a second preferred embodiment of the present invention.
Figure 5:
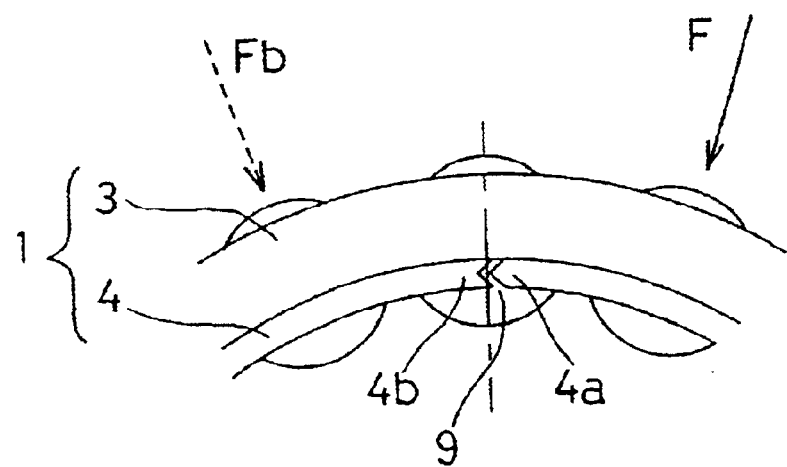
FIG. 5 is a fragmentary end view showing, on an enlarged scale, a portion of the caged roller assembly shown in FIG. 4.

FIGS. 4 and 5 pertain to the caged roller assembly according to a second preferred embodiment of the present invention, wherein FIG. 4 shows an end view thereof and FIG. 5 illustrates a portion of the caged roller assembly on an enlarged scale. The caged roller assembly according to this second embodiment is substantially similar to that according to the previously described embodiment, except for the difference residing in shape of the slit 9 defined between the opposite ends 4a and 4b of the inner retainer 4. Specifically, the opposite ends 4a and 4b on respective sides of the slit 9 are so configured as to be engageable with each other in a direction radially of the inner retainer 4. In the illustrated embodiment, the opposite ends 4a and 4b are so formed or so shaped as to provide a generally V-shaped, circumferentially outwardly extending protrusion and a correspondingly V-shaped, circumferentially inwardly extending groove complemental in shape to the shape of the V-shaped protrusion, respectively, thereby to mate with each other with a small gap therebetween.

Particular shapes of the protrusion and groove may not be limited to those shown therein, but any shapes may be employed so far as the opposite ends 4a and 4b can engage with each other so that one of the opposite ends 4a and 4b will not be disengaged from the other of the opposite ends 4a and 4b in a direction radially of the caged roller assembly. It is particularly to be noted that in a normal condition in which the rollers 2 are retained in the right position as designed, a surface defining the V-shape protrusion and a surface defining the V-shaped groove of the opposite ends 4a and 4b are slightly spaced from each other with a gap defined therebetween as best shown in FIG. 5, but will contact each other in the event of occurrence of displacement one of the opposite ends 4a and 4b relative to the other of the opposite ends 4a and 4b in a direction radially of the caged roller assembly. Also, engagement between the protrusion and the mating groove may suffice to take place when the outer and inner retainers 3 and 4 are assembled together to complete the caged roller bearing. However, in a natural state of the inner retainer 4 as manufactured, that is, in a condition in which the inner retainer 4 is not deformed against its own resiliency, the surface defining the protrusion and the surface defining the mating groove are separated from each other in the circumferential direction with no engagement taking place therebetween.

Where the opposite ends 4a and 4b of the inner retainer 4 are so designed as to be engageable with each other as hereinabove described, the following advantage can be appreciated.

Assuming that a load Facts on the caged roller assembly in a direction radially inwardly thereof, tending to cause the inner retainer 4 to be radially inwardly deformed, the use of the mere straight slit 9 such as in the embodiment shown in and described with reference to FIGS. 1 to 3 will in some occasions result in one of opposite end portions of the inner retainer 4 being radially inwardly deformed to such an extent as to cause separation of some of the rollers 2. To avoid this possibility, the inner retainer 4 used in the previously described embodiment is required to have a sufficient rigidity.

However, in the second embodiment shown in FIGS. 4 and 5, when the slit 9 is so shaped and so configured as to permit the opposite ends 4a and 4b of the inner retainer 4 to be engageable with each other in the direction radially of the caged roller assembly, the opposite ends 4a and 4b on respective sides of the slit 9 can engage with each other in the event that one of the opposite ends 4a and 4b is radially deformed relative to the other of the opposite ends 4a and 4b. Thus, the rigidity of one of the opposite ends 4b remote from the other of the opposite ends 4a where the radially inwardly acting load F is imposed can provide a resistance to the load F, making it difficult for the inner retainer 4 to be deformed radially inwardly. Even if a similar load Fb acts radially inwardly on such one end 4b of the inner retainer 4 or in the vicinity thereof, radially inward deformation of the inner retainer 4 will hardly occur by a similar reason. In view of this, according to the second embodiment, even though the inner retainer 4 as a whole may not be designed to exhibit a sufficient rigidity, any possible separation of some of the rollers 2 which would result from radially inward deformation of the inner retainer 4 can be effectively avoided and, hence, a function of preventing the rollers 2 from the corresponding pockets can be reinforced.

Other structural features and accompanying advantages of the caged roller assembly according to the second embodiment than those described above are similar to those shown in and described with reference to FIGS. 1 to 3 and, therefore, the details thereof are not reiterated for the sake of brevity.

Figure 6A:
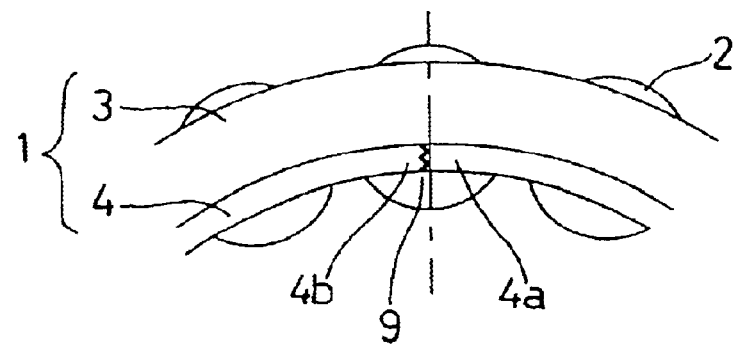
FIG. 6A to 6C are fragmentary end views, on an enlarged scale, of the caged roller assembly, showing different modifications of slits employed therein, respectively.
Figure 6B:
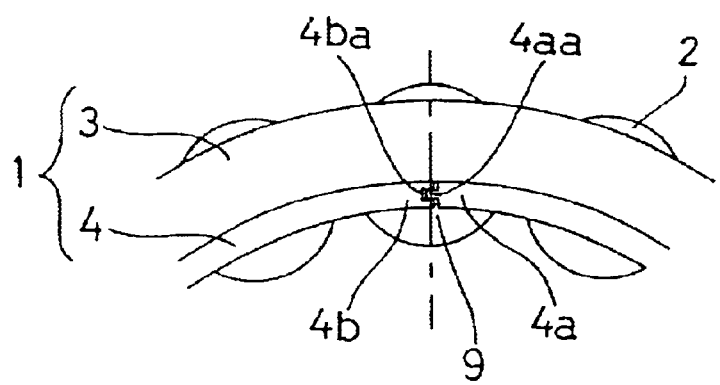
Figure 6C:
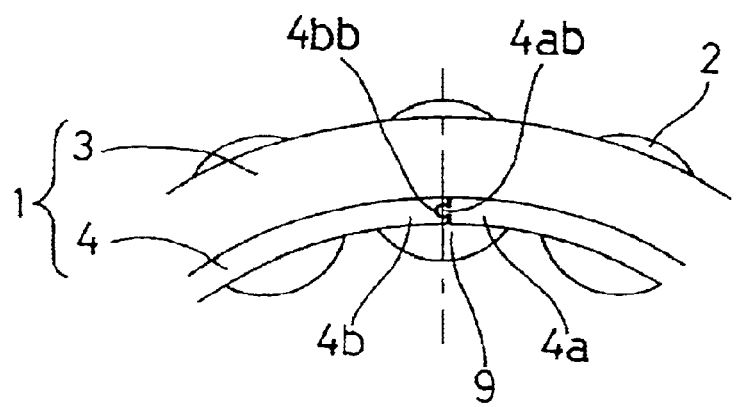

As hereinbefore mentioned, particular shapes of the protrusion and groove forming the slit 9 may not be limited to those shown therein, but any shapes may be employed so far as the inner retainer 4 can be deformed radially inwardly, some of examples of which are shown in FIGS. 6A to 6C.

In the example shown in FIG. 6A, the opposite ends 4a and 4b of the inner retainer 4 are formed respectively with a plurality of circumferentially outwardly extending protrusions, that are lined parallel to each other in a direction widthwise of the inner retainer 4, and correspondingly circumferentially inwardly extending grooves that are lined parallel to each other in a direction widthwise of the inner retainer 4 and complemental in shape to the protrusions. In the natural state and the normal condition of the inner retainer 4, the parallel protrusions and the parallel grooves provide a gap therebetween in a manner substantially similar to that shown in FIG. 5.

In the example shown in FIG. 6B, the opposite ends 4a and 4b of the inner retainer 4 are formed respectively with a generally rectangular-sectioned protrusion 4aa protruding circumferentially outwardly therefrom and a correspondingly rectangular-sectioned groove 4ba extending circumferentially inwardly therefrom and complemental in shape to the shape of the rectangular protrusion. Side faces of the rectangular-sectioned protrusion 4aa that are opposite to each other in a radial direction may be held in contact with similarly opposite side faces of the rectangular-sectioned groove 4ba. In other words, in the normal state of the inner retainer 4, the opposite ends 4a and 4b may be held in an engaged relation with respect to the radial direction of the caged roller assembly while leaving a gap therebetween in the circumferential direction.

In the example shown in FIG. 6C, in place of the rectangular sectioned protrusion 4aa and groove 4ba employed in the example of FIG. 6B, a generally rounded or semispherical protrusion 4ab and a similarly rounded or semispherical groove 4bb are employed in the opposite ends 4a and 4b, respectively.

Figure 7A:
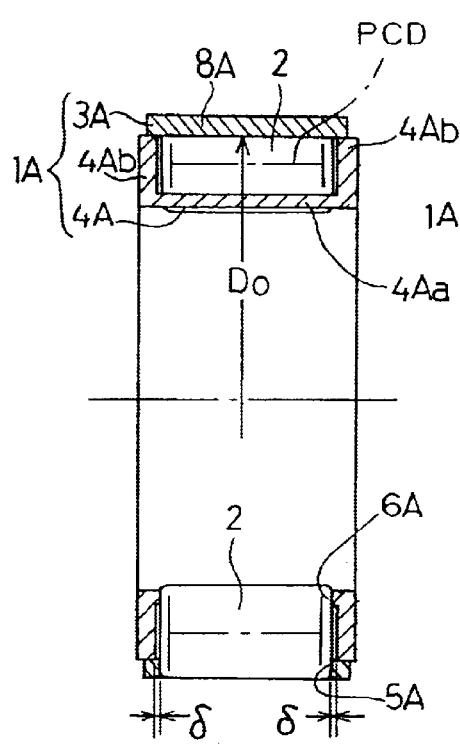
FIG. 7A is a longitudinal sectional view of the caged roller assembly according to a third preferred embodiment of the present invention.
Figure 7B:
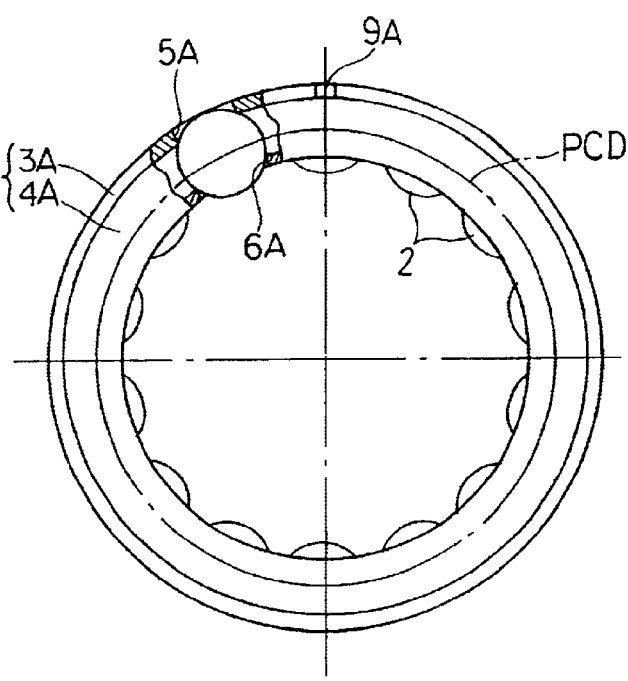
FIG. 7B is an end view of the caged roller assembly shown in FIG. 7A.

FIGS. 7A and 7B illustrates a third preferred embodiment of the present invention. The caged roller assembly shown in FIGS. 7A and 7B are substantially similar to that shown in FIGS. 1 to 3, except that the outer and inner retainers 3 and 4 are reversed in construction.

Referring now to FIGS. 7A and 7B, the outer retainer 3A is of a cylindrical configuration having a diameter (either inner or outer) greater than the pitch circle diameter PAD of the circumferential array of the rollers 2, whereas the inner retainer 4A has a annular body 4Aa of a diameter (either inner or outer) smaller than the pitch circle diameter PAD and also has first and second annular collars 4Ab that are formed by bending opposite end portions of the annular body 4Aa so as to extend radially outwardly therefrom. A plurality of generally rectangular pockets 5A are formed in the outer retainer 3A in a circumferentially equidistantly spaced relation so as to leave pillars 8A each between the neighboring pockets 5A, while similarly rectangular pockets 6A are formed in the annular body 4Aa of the inner retainer 4 in a similarly circumferentially equidistantly spaced relation so as to leave pillars each between the neighboring pockets 6A. Each of the rollers 2 is supported by the outer and inner retainers 3A and 4A while being movably received in part within the corresponding pocket 5A and in part within the mating pocket 6A.

The outer retainer 3A that is a collarless member is capable of being circumferentially outwardly deformed to a diameter greater than the circumscribed circle diameter Do depicted by the circumferential array of the rollers 2. For this purpose, even in this embodiment, the outer retainer 3A is of a split ring shape having a single slit 9A defined therein so as to extend straight across the outer retainer 3A in a direction axially of the cage 1 thereby leaving opposite ends in the outer retainer 3A. The position where the slit 9A is defined in the outer retainer 3A may be at one of the pillars 8A or in alignment with one of the pockets 6A. This outer retainer 3A, when in an elastically restored state, may be of a size sufficient to allow it to be resiliently urged against outer peripheral edges of the respective collars 4Ab of the inner retainer 4A.

According to the embodiment shown in and described with reference to FIGS. 7A to 7C, the caged roller assembly can be assembled by first mounting the rollers 2 on the inner retainer 4A, that is a collared member, with the rollers 2 received in part within the corresponding pockets 6A and then mounting the outer retainer 3A over the circumferentially array of the rollers 2 with different portions of the rollers received in the corresponding pockets 5A. Specifically, when the outer retainer 3A is so mounted, the outer retainer 3A is circumferentially outwardly deformed against its own resiliency to a diameter greater than the circumscribed circle diameter of the circumferential array of the rollers 2 so that after the outer retainer 3A has been mounted over the circumferential array of the rollers 2 the outer retainer 3A can circumferentially inwardly restored by the effect of its own resiliency to a diameter smaller than the circumscribed circle diameter Do. This is possible because of the presence of the slit 9A that allows the outer retainer 3A to be resiliently deformed in the manner described above. Thus, the caged roller assembly according to the foregoing embodiment has an excellent assimilability.

Even with the caged roller assembly according to the third embodiment, a relatively large load bearing capacity can be secured within a limited space and, also, the caged roller assembly can have an improved roller guiding function while being robust in strength and accuracy. Moreover, the provision of the collars 4Ab in the inner retainer 4A is effective to avoid any possible interference with inner peripheral surfaces of neighboring component parts even though the cage 1A is brought into sliding contact with such neighboring component parts.

It is, however, to be noted that when the embodiment shown in and described with reference to FIGS. 7A and 7B is to be worked out, the outer retainer 3A has a width, or a length as measured in a direction axially of the cased roller assembly, that is slightly smaller than the width of the inner retainer 4A by the following reason.

Where the single-slit split ring configuration is employed in the outer retainer 3A such as shown and described, the slit 9A will enlarge in size under the influence of a centrifugal force during the use of the caged roller assembly as a bearing, to such an extent as to result in an excessive loosening of the outer retainer 3A. Once this occurs, the outer retainer 3A may displace in a direction axially of the caged roller assembly, departing from the right position where it has been radially aligned with the inner retainer 4A.

Accordingly, if the width of the outer retainer 3A is chosen to be slightly smaller than the width of the inner retainer 4A, a slight axial displacement, if any, of the outer retainer 3A as a result of loosening of the outer retainer 3A in the manner described above will not lead to any protrusion of either one of the opposite sides of the outer retainer 3A axially beyond a plane containing an outer annular surface of the adjacent collar 4Ab integral with the inner retainer 4A, thereby avoiding any possible interference with neighboring component parts. Considering that the rollers 2 are in part received within the respective pockets 5A in the outer retainer 3A, the distance over which the outer retainer 3A when loosened may displace axially would be at most twice the pocket gap δ, that is, the size of a gap delimited between one of opposite ends of each roller 2 and the adjacent end of the corresponding pocket 5A. Accordingly, the width of the outer retainer 3A is chosen to satisfy, for example, the following relationship with due regards paid to the pocket gap δ.

Width of Outer Retainer≦(Width of Inner Retainer−2δ)

Figure 7C:
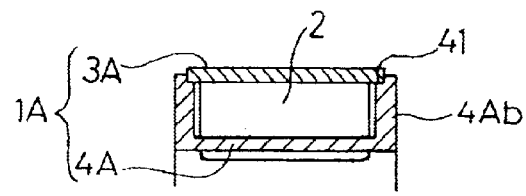
FIG. 7C is a fragmentary longitudinal sectional view showing a modified form of the caged roller assembly of FIG. 7A.

Also, as best shown in FIG. 7C, each of the outer peripheral edges of the respective collars 4Ab may be formed with generally L-shaped steps 41 that confront with each other in a direction axially of the caged roller assembly so that when the outer retainer 3A is mounted on the inner retainer 4A the opposite side edges of the outer retainer 3A can be seated in the respective steps 41. This manner of mounting is effective to substantially eliminate or minimize the axial displacement of the outer retainer 3A relative to the inner retainer 4A. It is to be noted that this method of mounting the collarless member on the collared member substantially as shown in FIG. 7C can be equally applied to the case in which the outer retainer serves as a collared member such as in the first embodiment described hereinbefore.

Thus, even in the embodiment in which the outer retainer 3A serves as the collarless member, the slit 9A delimited between the opposite ends of the outer retainer 3A can take such a shape that the opposite ends of the outer retainer 3A can engage with each other in the radial direction of the caged roller assembly as discussed in connection with any one of the embodiments shown respectively in FIGS. 4 to FIG. 6C. Thus, in the event that a radially outwardly acting load acts on the outer retainer 3A by the rollers 2 positioned adjacent the slit 9A, tending the outer retainer 3A to be circumferentially outwardly deformed, such circumferentially outward deformation of the outer retainer 3A will hardly occur, exhibiting a satisfactory function of preventing the rollers from separating out of the associated pockets.

It is to be noted that in the foregoing description, the relation in width or axial length between the outer retainer 3A and the inner retainer 4A has been described in conjunction with the inner retainer 4A representing the collared member. However, where the outer retainer is used as the collared member such as in the first embodiment of the present invention, the outer retainer 3 preferably has a width greater than that of the inner retainer 4.

Where the outer retainer 3 is used as the collared member, the following relation is preferred to be satisfied.

Width of Outer Retainer≧(Width of Inner Retainer−2δ)

Wherein δ has been defined above.

In any one of the foregoing embodiments of the present invention, a method of and material for the collarless member 4 or 3A of the cage 1 or 1A are so chosen as follows. By way of example, the collarless member 4 or 3A can be manufactured either by curing a metal strip to a round shape with its opposite ends welded together, followed by forming a crevasse at one location over the circumference thereof to thereby define the slit, or merely by curing a metal strip to represent a generally split ring shape. The reason that the slit is formed after the opposite ends of the curled metal strip have been welded together is because a complete round shape can easily be obtained in the metal strip so curled.

Material for the collarless member 4 or 3A may be, for example, a low carbon steel or a spring steel which has been heat-treated, regardless of whether the collarless member 4 or 3A is prepared from the above described metal strip or according to any other processing method. The heat treatment may be a hardening process such as, for example, carbonization with or without tempering followed subsequently. It is to be noted that in place of the hardening process, a surface hardening treatment such as, for example, a nitrocarburizing. process may be employed.

Also, the collarless member 4 or 3A may be formed by the use of a grinding technique or a press work. Material for the collarless member 4 or 3A may be a metallic material such as a ferrous material or a synthetic resin. Similarly, the collared member 3 or 4A may be made of either a metallic material or a synthetic resin. Where no slit is formed in the collarless member 4 or 3A, such collarless member 4 or 3A is preferably made of an elastic synthetic resin so that it can be radially inwardly and outwardly deformed.

In any one of the foregoing embodiments of the present invention, the collarless member 4 or 3A has been described as representing a generally split ring shape having the slit 9 or 9A defined therein. However, in an alternative embodiment, the slit 9 or 9A may not extend completely across the width of the collarless member and, instead thereof, a single slit or preferably a plurality of slits extending a distance smaller than the width of the collarless member may be formed in the collarless member at respective locations on the circumference of the collarless member. Even where the slit of a length smaller than the width of the collarless member is employed, the collarless member can be deformed radially inwardly and outwardly owing to its own elastic deformability, Also, where the slit of a length smaller than the width of the collarless member is employed, the slit may have such a shape that the opposite ends of the collarless member on respective sides of the slit can engage with each other in the radial direction of the caged roller assembly.

Yet, although in any one of the foregoing embodiments of the present invention, each of the annular body 3a or 4Aa of the outer retainer 3 or 3A and the inner retainer 4 or 4Aa has been described having the pillars each defined between the neighboring pockets, the annular body 3a or 4Aa may have pawls in place of the pillars.

Figure 8:
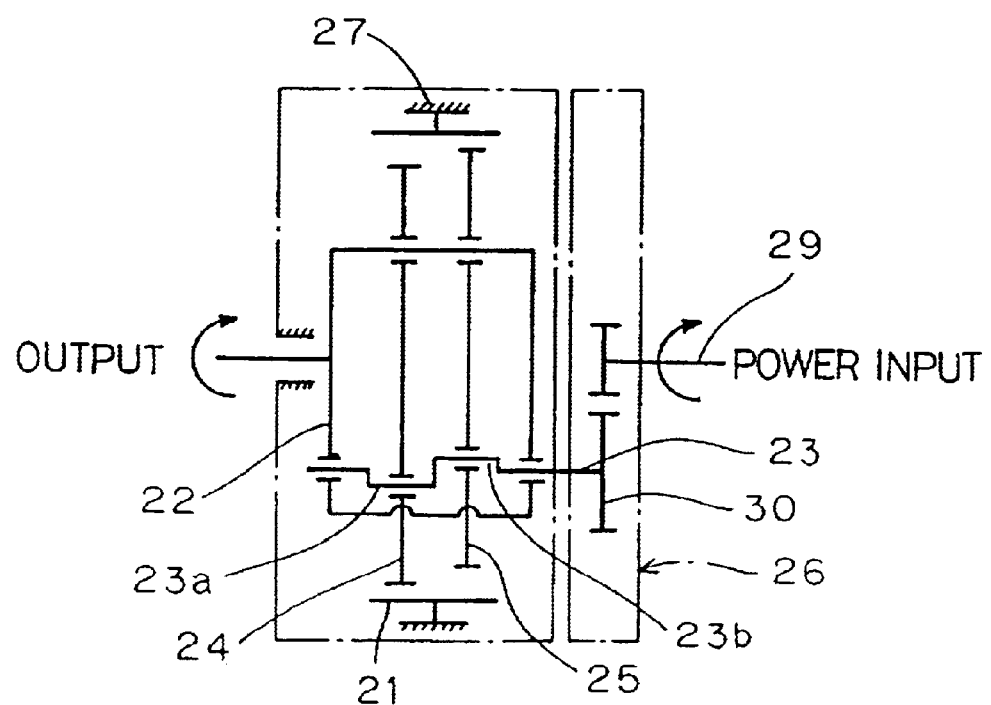
FIG. 8 is a schematic diagram showing a planetary gear reduction unit employing the caged roller assembly shown in FIG. 7A.
Figure 9:
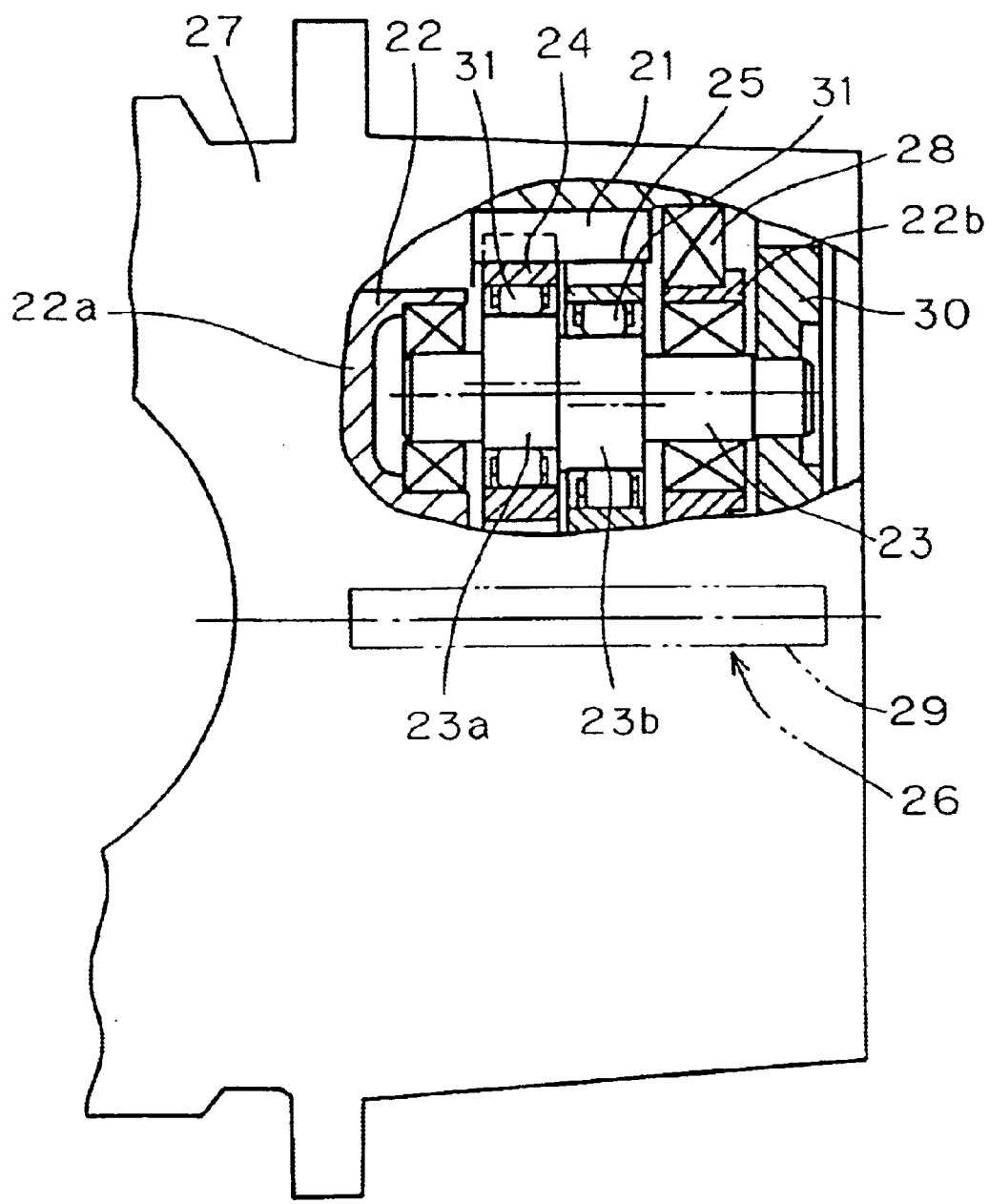
FIG. 9 is a fragmentary longitudinal view, with a portion cut out, showing the caged roller assembly of the present invention employed in the planetary gear reduction unit shown in FIG. 8.
Figure 10A:
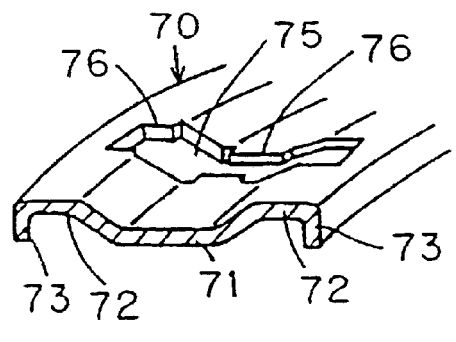
FIG. 10A is a fragmentary perspective view showing a roller retainer employed in the prior art caged roller assembly.
Figure 10B:
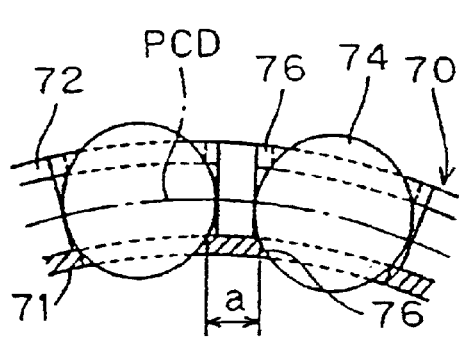
FIG. 10B is a fragmentary transverse sectional view of a portion of the prior art caged roller assembly, showing the details of the roller retainer employed therein.
Figure 11A:
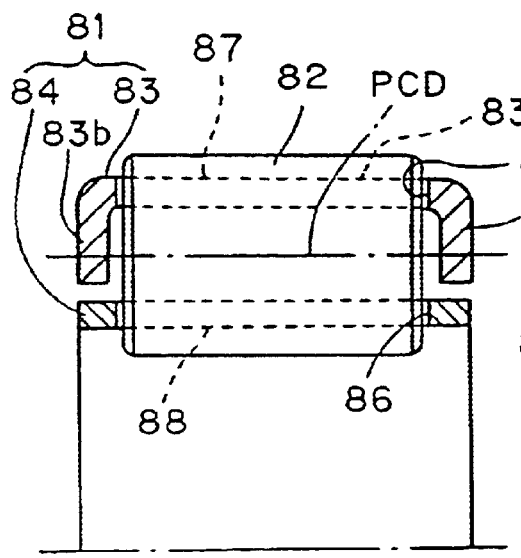
FIG. 11A is a fragmentary longitudinal sectional view of another prior art caged roller assembly.
Figure 11B:
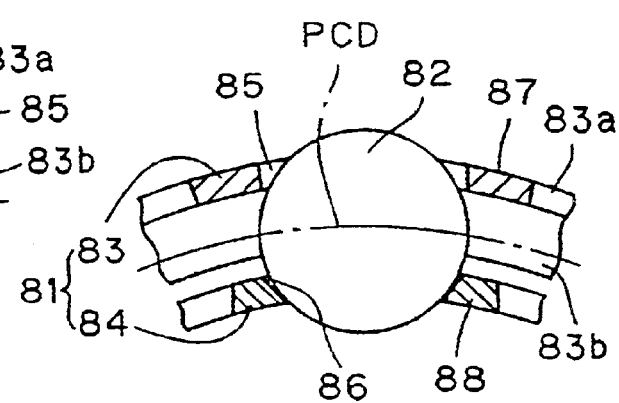
FIG. 11B is a fragmentary transverse sectional view of that portion of the prior art caged roller assembly of FIG. 11A.

FIGS. 8 and 9 illustrate an example of the planetary gear reduction unit to which the caged roller assembly of the present invention is applied. Referring to these figures, the planetary gear reduction unit includes an internally threaded ring gear (a sun gear) 21, a carrier 22 that provides an rotation output element, a crankshaft 23 rotatably supported by the carrier 22 and having a plurality of crank pins 23a and 23b positioned eccentrically with an axis of the crankshaft 23, a plurality of planetary gears 24 and 25 rotatably mounted on the respective crank pins 23a and 23b and meshed with the internally threaded ring gear 21, and a rotation input element 26 through which a drive force is transmitted to the crankshaft 23 The ring gear 21 represents a sun gear having an inner periphery formed with a plurality of internal threads.

The ring gear 21 is fixed to a housing 27, whereas the carrier is disposed within the housing 27 through a bearing assembly 28 (FIG. 9) for rotation about an axis concentric with the ring gear 21. The rotation input element 26 is made up of an input shaft 29 coaxial with the ring gear 21 and rotatable together therewith, and a transmission gear 30 fixedly mounted on the crankshaft 23 and meshed with an externally threaded gear rigid with the input shaft 29. The crankshaft 23 is provided at a plurality of, for example, three, locations in a direction circumferentially of the carrier 22. As best shown in FIG. 9, the planetary gears 24 and 25 are mounted on the respective crank pins 23a and 23b through corresponding caged roller assemblies 31, each of which may be of the structure shown and described in conjunction with any one of the first and second embodiments of the present invention.

The planetary gear reduction unit of the structure and utilizing the caged roller assemblies as discussed above operates in the following manner. When the input shaft 29 is driven, the three crankshafts 23 are synchronously driven at a first reduced speed through the transmission gear 30 then drivingly coupled with the input shaft 29. This first reduced speed is lower than the rotational speed of the input shaft 29. The crankshafts 23 and the planetary gears 24 and 25 are drivingly coupled with each other through the associated caged roller assemblies 31 and a cranking motion of each of the crankshafts 23 is synchronized with a composite motion of revolution about an axis of the ring gear 21 of the planetary gears 24 and 25 along the internally threaded ring gear 21 and rotation thereof about respective axies. The two planetary gears 24 and 25 juxtaposed with each other in an axial direction revolve along the internally threaded ring gear 21 in 180° phase offset relation with each other and, accordingly, inertia forces generated by the planetary gears 24 and 25 during the cranking motion can be counteracted with each other. While the internally threaded ring gear 21 is fixed in position, the planetary gears 24 and 25 undergo angular movement within the internally threaded ring gear 21. The three crankshaft 23 are positioned between two discs 22a and 22b of the carrier 22 that serves as the output element. Accordingly, revolution of the planetary gears 24 and 25 is transmitted to the carrier 22 through the revolution of the crankshafts 23 about an axis of the carrier 22, resulting a rotary motion at a further reduced speed.

In this planetary gear reduction unit of the structure described above, a relatively large load tends to be imposed on the caged roller assemblies 31 each interposed between the planetary gear 24 or 25 and the crankshaft 23 and, in addition, a space available for installation of each caged roller assembly 31 is limited for the purpose of avoiding the reduction gear unit as a whole from getting bulky in size. Also, the cage of each of the caged roller assemblies 31 is or may be generally held in sliding contact with side faces of the neighboring planetary gears 24 and 25.

However, the use in the planetary gear reduction unit of the caged roller assemblies each constructed in accordance with the present invention is effective in that a relatively large load bearing capacity can be obtained within the limited space, and since one of the outer and inner retainers 3 and 4 is provided with the collars 3b that protrude laterally outwardly towards the other of the outer and inner retainers 3 and 4, no problem associated with interference with respective inner peripheral surfaces of the planetary gears 24 and 25 will occur even though the collars are brought in sliding contact with the side faces of the neighboring component parts.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A caged roller assembly which comprises:

a cage including outer and inner members; and a circumferential array of rollers movably retained by the cage, said circumferential array of the rollers defining a pitch circle diameter and having inscribed and circumscribed circle diameters;

said outer member including an annular body of a diameter greater than the pitch circle diameter of the circumferential array of the rollers and annular collars each formed by bending one of opposite end portions of the annular body so as to extend radially inwardly therefrom, said outer member having pockets defined in the annular body in circumferentially spaced relation to each other;

said inner member being of an annular shape having a diameter smaller than the pitch circle diameter of the circumferential array of the rollers and also having pockets defined therein in circumferentially spaced relation to each other;

said rollers being movably supported by the cage while received in part within the corresponding pockets in the annular body of the outer member and in part within the corresponding pockets in the inner member;

said inner member having a capability of being deformed to a diameter smaller than the inscribed circle diameter of the circumferential array of the rollers;

said inner member being provided with a slit therein, creating ends of the inner member opposite to each other; and said outer member not being provided with a slit therein.

2. A caged roller assembly which comprises:

a cage including outer and inner members; and a circumferential array of rollers movably retained by the cage, said circumferential array of the rollers defining a pitch circle diameter and having inscribed and circumscribed circle diameters;

said outer member being of an annular shape having a diameter greater than the pitch circle diameter of the circumferential array of the rollers and also having pockets defined therein in circumferentially spaced relation to each other;

said inner member including an annular body of a diameter smaller than the pitch circle diameter of the circumferential array of the rollers and annular collars each formed by bending one of opposite end portions of the annular body so as to extend radially outwardly therefrom, said inner member having pockets defined in the annular body in circumferentially spaced relation to each other;

said rollers being movably supported by the cage while received in part within the corresponding pockets in the annular body of the outer member and in part within the corresponding pockets in the inner member;

said outer member having a capability of being deformed to a diameter greater than the circumscribed circle diameter of the circumferential array of the rollers;

said outer member being provided with a slit therein, creating ends of said outer member opposite to each other; and said inner member not being provided with a slit therein.

3. The caged roller assembly as claimed in claim 1, wherein said slit defined in said inner member extends in a direction axially of the caged roller assembly.

4. The caged roller assembly as claimed in claim 2, wherein said slit defined in said outer member extends in a direction axially of the caged roller assembly.

5. The caged roller assembly as claimed in claim 1, wherein said slit defined extends in a direction axially of the caged roller assembly, said slit being so shaped as to permit opposite ends of said inner member on respective sides of the slit to be engageable with each other in a direction radially of the caged roller assembly.

6. The caged roller assembly as claimed in claim 2, wherein said slit defined extends in a direction axially of the caged roller assembly, said slit being so shaped as to permit opposite ends of said outer member on respective sides of the slit to be engageable with each other in a direction radially of the caged roller assembly.

7. The caged roller assembly as claimed in claim 1, disposed between a planetary gear of a planetary gear reduction unit and a crankshaft supporting the planetary gear.

8. The caged roller assembly as claimed in claim 2, disposed between a planetary gear of a planetary gear reduction unit and a crankshaft supporting the planetary gear.

9. A planetary gear reduction unit, which comprises:

an internally or externally threaded sun gear;

a carrier disposed rotatably in a coaxial relation with the sun gear;

a crankshaft supported rotatably by the carrier and having a plurality of neighboring crank pins positioned eccentrically with an axis of the crankshaft; and a plurality of planetary gears mounted rotatably on the respective crank pins of the crankshaft through corresponding caged roller assemblies and meshed with the sun gear;

each of said caged roller assemblies comprising, a cage including outer and inner members, and a circumferential array of rollers movably retained by the cage, said circumferential array of the rollers defining a pitch circle diameter and having inscribed and circumscribed circle diameters, said rollers being capable of undergoing a rolling motion between the corresponding planetary gear and the corresponding crank pin of the crankshaft;

each of said outer and inner members having respective annular bodies of diameters greater and smaller than the pitch circle diameter of the circumferential array of the rollers;

said outer member also having annular collars each formed by bending one of opposite end portions of the annular body of the outer member so as to extend radially inwardly therefrom; said outer member having pockets defined in the annular body in circumferentially spaced relation to each other;

said inner member having pockets defined therein in circumferentially spaced relation to each other;

said rollers being movably supported by the cage while received in part within the corresponding pockets in the annular body of the outer member and in part within the corresponding pockets in the inner member;

said inner member having a capability of being deformed to a diameter smaller than the inscribed circle diameter of the circumferential array of the rollers;

said inner member being provided with a slit therein, creating ends of the inner member opposite to each other; and said outer member not being provided with a slit therein.

10. A planetary gear reduction unit, which comprises:

an internally or externally threaded sun gear;

a carrier disposed rotatably in a coaxial relation with the sun gear;

a crankshaft supported rotatably by the carrier and having a plurality of neighboring crank pins positioned eccentrically with an axis of the crankshaft; and a plurality of planetary gears mounted rotatably on the respective crank pins of the crankshaft through corresponding caged roller assemblies and meshed with the sun gear;

each of said caged roller assemblies comprising,
a cage including outer and inner members, and
a circumferential array of rollers movably retained by the cage, said circumferential array of the rollers defining a pitch circle diameter and having inscribed and circumscribed circle diameters, said rollers being capable of undergoing a rolling motion between the corresponding planetary gear and the corresponding crank pin of the crankshaft;

each of said outer and inner members having respective annular bodies of diameters greater and smaller than the pitch circle diameter of the circumferential array of the rollers;

said inner member also having annular collars each formed by bending one of opposite end portions of the annular body of the inner member so as to extend radially outwardly therefrom; said inner member having pockets defined in the annular body in circumferentially spaced relation to each other;

said outer member having pockets defined therein in circumferentially spaced relation to each other;

said rollers being movably supported by the cage while received in part within the corresponding pockets in the annular body of the outer member and in part within the corresponding pockets in the inner member;

said outer member having a capability of being deformed to a diameter greater than the circumscribed circle diameter of the circumferential array of the rollers;

said outer member being provided with a slit therein, creating ends of said outer member opposite to each other; and said inner member not being provided with a slit therein.

11. A cage for a caged roller assembly having a circumferential array of rollers, the cage comprising:

outer and inner members, wherein one of the outer and inner members is provided with a slit therein, creating engageable ends opposite to each other, the remaining one of the outer and inner members is not provided with a slit therein, and the member with the provided slit is elastically deformable to a diameter greater than a circumscribed circle diameter of the circumferential array of rollers if the member is the outer member, and elastically deformable to a diameter smaller than an inscribed circle diameter of the circumferential array of rollers if the member is the inner member.

12. The cage according to claim 11, wherein the member without the slit comprises:

an annular body with annular collars, each annular collar being formed by bending one of opposite end portions of the annular body, wherein if the member without the slit is the outer member, the annular collars extend radially inwardly therefrom, and if the member without the slit is the inner member, the annular collars extend radially outwardly therefrom.

* * * * *

UNITED STATES PATENT AND TRADEMARK OFFICE
CERTIFICATE OF CORRECTION

PATENT NO. : 6,857,785 B2  
DATED : February 22, 2005  
INVENTOR(S) : Yasuaki Takahashi et al.

It is certified that error appears in the above-identified patent and that said Letters Patent is hereby corrected as shown below:

<u>Title page,</u>  
Item [57], ABSTRACT,  
Line 2, delete "assimilability" and insert -- assemblability --.  
Lines 8 and 12, delete "PAD" and insert -- PCD --.

Signed and Sealed this

Second Day of May, 2006

JON W. DUDAS  
*Director of the United States Patent and Trademark Office*

UNITED STATES PATENT AND TRADEMARK OFFICE
CERTIFICATE OF CORRECTION

PATENT NO. : 6,857,785 B2
APPLICATION NO. : 10/098369
DATED : February 22, 2005
INVENTOR(S) : Yasuaki Takahashi et al.

It is certified that error appears in the above-identified patent and that said Letters Patent is hereby corrected as shown below:

First Page, Column 1, under U.S. Patent Documents, insert the following U.S. patent numbers:

| --3,627,391 | 12/1971 | Bingle |
| 4,239,304 | 12/1980 | Wakunami |
| 4,235,487 | 11/1980 | Schard |
| 4,492,415 | 1/1985 | Baile et al. |
| 6,176,623 | 1/2001 | Zeigler |
| 6,394,659 | 5/2002 | Earthrowl |
| 5,184,899 | 2/1993 | Harimoto |
| 5,743,659 | 4/1998 | Stewart |
| 5,862,592 | 1/1999 | Harimoto et al.-- |

Signed and Sealed this

Sixth Day of January, 2009

JON W. DUDAS
*Director of the United States Patent and Trademark Office*